US012786703B2

(12) United States Patent
Wang et al.

(10) Patent No.: US 12,786,703 B2
(45) Date of Patent: Nov. 3, 2026

(54) U2N RELAY (UP) PC5 LINK SETUP SECURITY WHEN USING GBA PUSH

(71) Applicant: InterDigital Patent Holdings, Inc., Wilmington, DE (US)

(72) Inventors: Zhibi Wang, Woodridge, IL (US); Samir Ferdi, Kirkland (CA); Taimoor Abbas, Sainte-Julie (CA); Xiaoyan Shi, Lake Oswego, OR (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 409 days.

(21) Appl. No.: 18/164,298

(22) Filed: Feb. 3, 2023

(65) Prior Publication Data

US 2023/0254690 A1 Aug. 10, 2023

Related U.S. Application Data

(60) Provisional application No. 63/306,745, filed on Feb. 4, 2022.

(51) Int. Cl.
*H04W 12/0471* (2021.01)
*H04W 12/0431* (2021.01)

(52) U.S. Cl.
CPC ... *H04W 12/0471* (2021.01); *H04W 12/0431* (2021.01)

(58) Field of Classification Search
CPC ............. H04W 12/06; H04W 12/0431; H04W 12/0471
See application file for complete search history.

(56) References Cited

U.S. PATENT DOCUMENTS

| | | | | |
|---|---|---|---|---|
| 2020/0100088 | A1* | 3/2020 | Kim | H04W 48/16 |
| 2020/0213858 | A1* | 7/2020 | Yi | H04W 8/26 |
| 2021/0345104 | A1* | 11/2021 | Cheng | H04W 12/0433 |
| 2022/0109996 | A1* | 4/2022 | Lee | H04W 76/14 |
| 2023/0011576 | A1* | 1/2023 | Bilgin | H04W 12/0433 |

(Continued)

OTHER PUBLICATIONS

Ren et al. A Formal Analysis of 5G ProSe AKA Protocols for U2N Relay Communication. IEEE (Year: 2024).*

(Continued)

*Primary Examiner* — Shewaye Gelagay
(74) *Attorney, Agent, or Firm* — Volpe Koenig

(57) ABSTRACT

A relay WTRU may receive, from a remote WTRU, a request for connection that includes a PRUK ID. The relay WTRU may transmit, to a PKMF associated with the relay WTRU, a key request message that includes the PRUK ID. The relay WTRU may receive, from the PKMF associated with the relay WTRU, a key response message that includes a GPI. The relay WTRU may transmit, to the remote WTRU, a direct security mode command message that includes the GPI. The relay WTRU may receive, from the remote WTRU, a direct security mode complete message. The relay WTRU may transmit, to the PKMF associated with the relay WTRU, a PRUK confirmation message. The relay WTRU, may receive, from the PKMF associated with the relay WTRU, an acknowledgement that the PRUK confirmation message was received, and transmit, to the second WTRU, an acceptance of the request for connection.

14 Claims, 10 Drawing Sheets

(56) References Cited

U.S. PATENT DOCUMENTS

2023/0319549 A1* 10/2023 Dees .................... H04W 12/06
455/410
2023/0370839 A1* 11/2023 Wifvesson .......... H04W 12/041
2024/0196206 A1* 6/2024 Fu ......................... H04W 12/02

OTHER PUBLICATIONS

Ericsson, "ProSe: New solution PC5 anchor key generation via GBA Push," 3GPP TSG-SA3 Meeting #105e, S3-214211, e-meeting (Nov. 8-19, 2021).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

Interdigital Inc., "Clarification related to GBA push recovery for UP," 3GPP TSG-CT WG1 Meeting #138-e, C1-225705, E-Meeting (Oct. 10-14, 2022).

Interdigital, "Update to U2N Security procedure over User Plane when using GBA Push," 3GPP TSG-SA3 Meeting #106-e, S3-220079, e-meeting (Feb. 14-25, 2022).

Third Generation Partnership Project, "Technical Specification Group Services and System Aspects; Proximity-based Services (ProSe); Security aspects (Release 16)," 3GPP TS 33.303 V16.0.0 (Jul. 2020).

Third Generation Partnership Project, "Technical Specification Group Services and System Aspects; Proximity-based Services (ProSe); Security aspects (Release 17)," 3GPP TS 33.303 V17.0.0 (Dec. 2021).

Third Generation Partnership Project, "Technical Specification Group Services and System Aspects; Proximity-based Services (ProSe); Security aspects (Release 17)," 3GPP TS 33.303 V17.1.0 (Sep. 2022).

Third Generation Partnership Project, "Technical Specification Group Services and System Aspects; Generic Authentication Architecture (GAA); Generic Bootstrapping Architecture (GBA) Push function (Release 17)," 3GPP TS 33.223 V17.1.0 (Dec. 2021).

Third Generation Partnership Project, "Technical Specification Group Services and System Aspects; Security Aspects of Proximity based Services (ProSe) in the 5G System (5GS) (Release 17)," 3GPP TS 33.503 V0.2.0 (Nov. 2021).

Third Generation Partnership Project, "Technical Specification Group Services and System Aspects; Security Aspects of Proximity based Services (ProSe) in the 5G System (5GS) (Release 17)," 3GPP TS 33.503 V17.2.0 (Dec. 2022).

Third Generation Partnership Project, "Technical Specification Group Services and System Aspects; Security aspects of 3GPP support for advanced Vehicle-to-Everything (V2X) services (Release 16)," 3GPP TS 33.536 V16.4.0 (Jun. 2021).

Third Generation Partnership Project, "Technical Specification Group Services and System Aspects; Security aspects of 3GPP support for advanced Vehicle-to-Everything (V2X) services (Release 16)," 3GPP TS 33.536 V16.5.0 (Jun. 2022).

Third Generation Partnership Project, "Technical Specification Group Services and System Aspects; Security aspects of 3GPP support for advanced Vehicle-to-Everything (V2X) services (Release 17)," 3GPP TS 33.536 V17.1.0 (Jun. 2022).

* cited by examiner

U2N RELAY (UP) PC5 LINK SETUP SECURITY WHEN USING GBA PUSH

CROSS-REFERENCE TO RELATED APPLICATIONS

This application claims the benefit of U.S. Provisional Application No. 63/306,745, filed Feb. 4, 2022, the contents of which are incorporated herein by reference.

BACKGROUND

A Proximity Service (ProSe) WTRU-to-network relay (relay WTRU) procedure consists of two distinct phases—(1) discovery of the relay WTRU and (2) communication between the remote WTRU and relay WTRU.

To generate a PC5 interface protection key, the remote WTRU may need a ProSe remote user key (PRUK) and an associated PRUK ID from a ProSe Key management Function (PKMF). The PRUK ID may be used to identify the PRUK that is then retrieved from the PKMF of the remote WTRU PKMF. The PRUK may be used to generate session key for any of the relays under a particular PKMF and hence only one PRUK for each remote WTRU is needed from a particular PKMF. This PRUK may need to be fetched by the remote WTRU from its PKMF while it is still in coverage.

The remote WTRU may fetch its PRUK from the PKMF using the key request/response messages or may receive one through generic bootstrapping architecture (GBA) Push as part of establishing the communication with the relay WTRU. The relay WTRU may fetch the key that will be used to secure the ProSe communication by sending to its PKMF, the PRUK ID or WTRU permanent ID if the remote WTRU does not have a valid PRUK.

If the remote WTRU establishes (e.g., derives) a new PRUK through a GBA Push message, it may overwrite any previously received or established PRUK. Once a PRUK established through a GBA Push message has been used to calculate a key for a successful relay connection establishment, the remote WTRU may delete any previous PRUK for this PKMF.

SUMMARY

In one embodiment, a relay WTRU may receive, from a remote WTRU, a request for connection. The request for connection may include a PRUK ID. The request for connection may be a Direct Communication Request message. The relay WTRU may transmit, to a PKMF associated with the relay WTRU, a key request message that includes the PRUK ID that was received from the remote WTRU. The key request message may also include a relay service code (RSC) and $K_{NRP}$ freshness parameter 1. The relay WTRU may receive, from the PKMF associated with the relay WTRU, a key response message that includes a GPI. On a condition that the relay WTRU successfully receives, from the remote WTRU, the key response message that includes the GPI, the relay WTRU may transmit, to the remote WTRU, a direct security mode command message that includes the GPI. The direct security mode command message may also include a $K_{NRP}$ freshness parameter 2. The relay WTRU may receive, from the remote WTRU, a direct security mode complete message. On a condition that the direct security mode complete message is successfully received from the remote WTRU, the relay WTRU may transmit, to the PKMF associated with the relay WTRU, a PRUK confirmation message. The relay WTRU, may receive, from the PKMF associated with the relay WTRU, an acknowledgement that the PRUK confirmation message was received, and transmit, to the second WTRU, an acceptance of the request for connection.

In one embodiment, a remote WTRU may transmit, to a relay WTRU, a direct connection request message that includes a first PRUK ID associated with a PRUK. The remote WTRU may receive, from the second WTRU, a direct connection reject message that includes a cause code. The remote WTRU may determine, based on the cause code, that the PRUK is out of sync with a PKMF associated with the remote WTRU. The remote WTRU may transmit, to the relay WTRU, a direct connection request message that includes a subscription concealed identifier (SUCI).

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
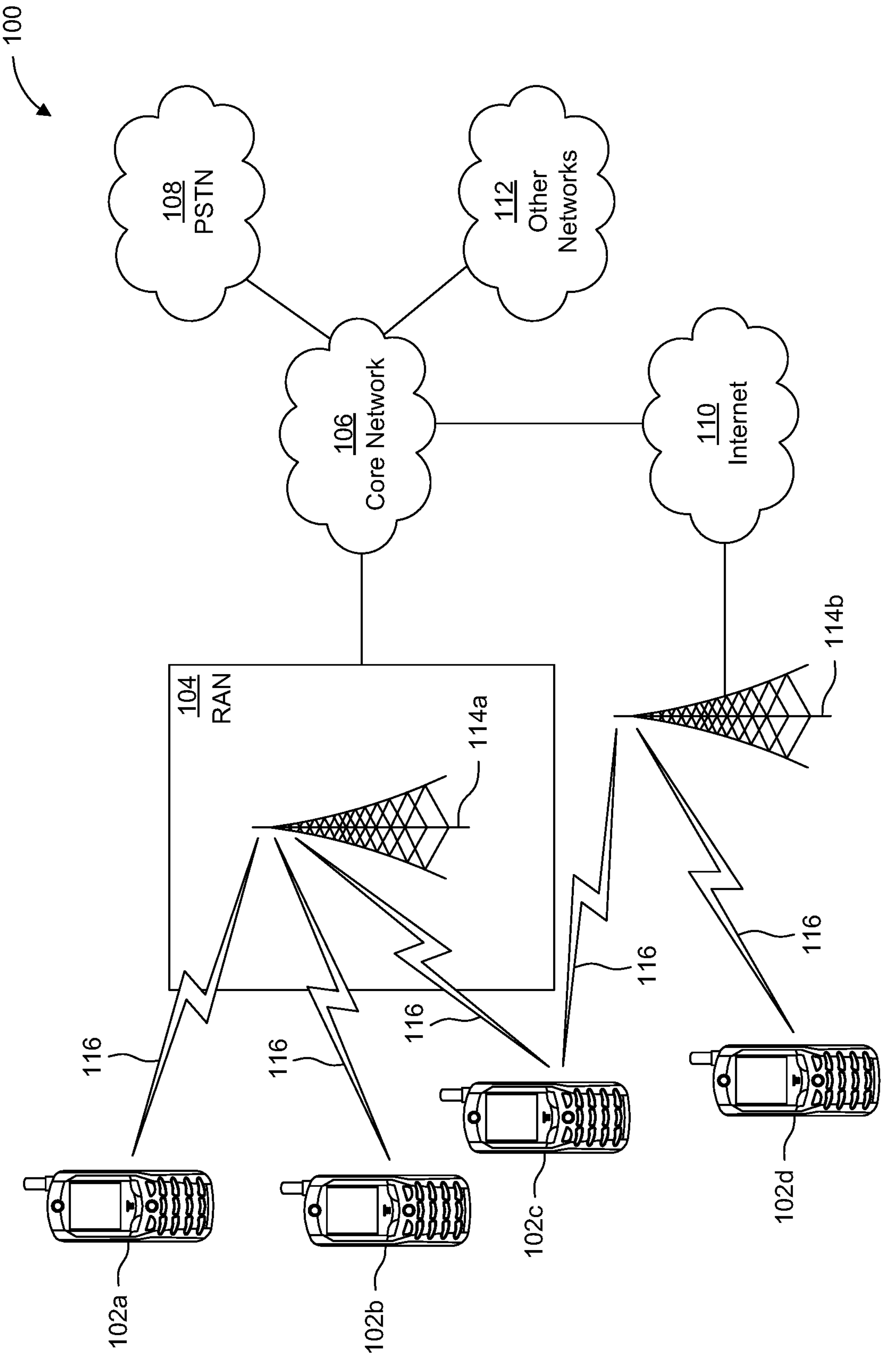
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA-F). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
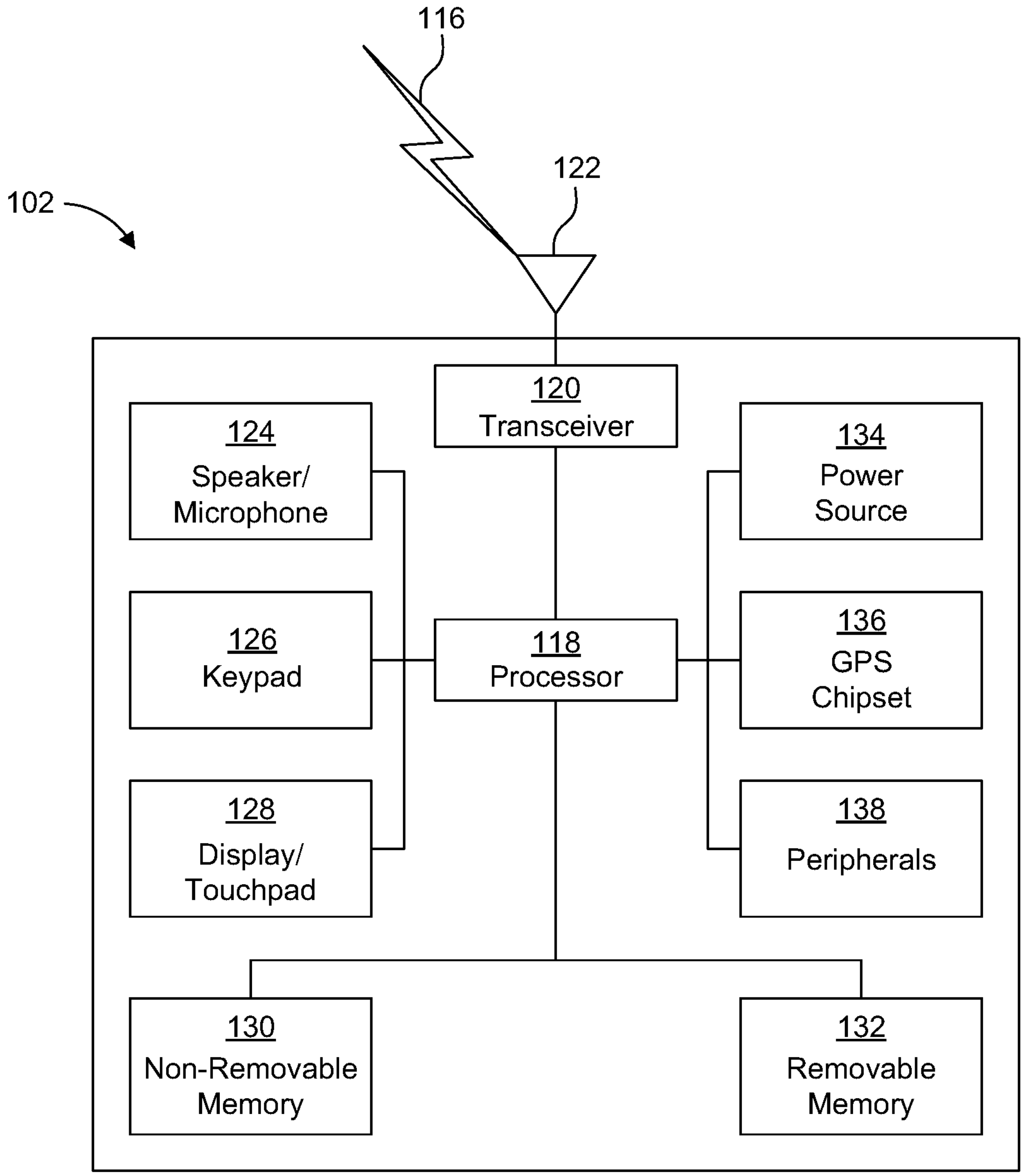
FIG. 1B is a system diagram illustrating an example wireless transmit/receive unit (WTRU) that may be used within the communications system illustrated in FIG. 1A according to an embodiment.
Figure 1C:
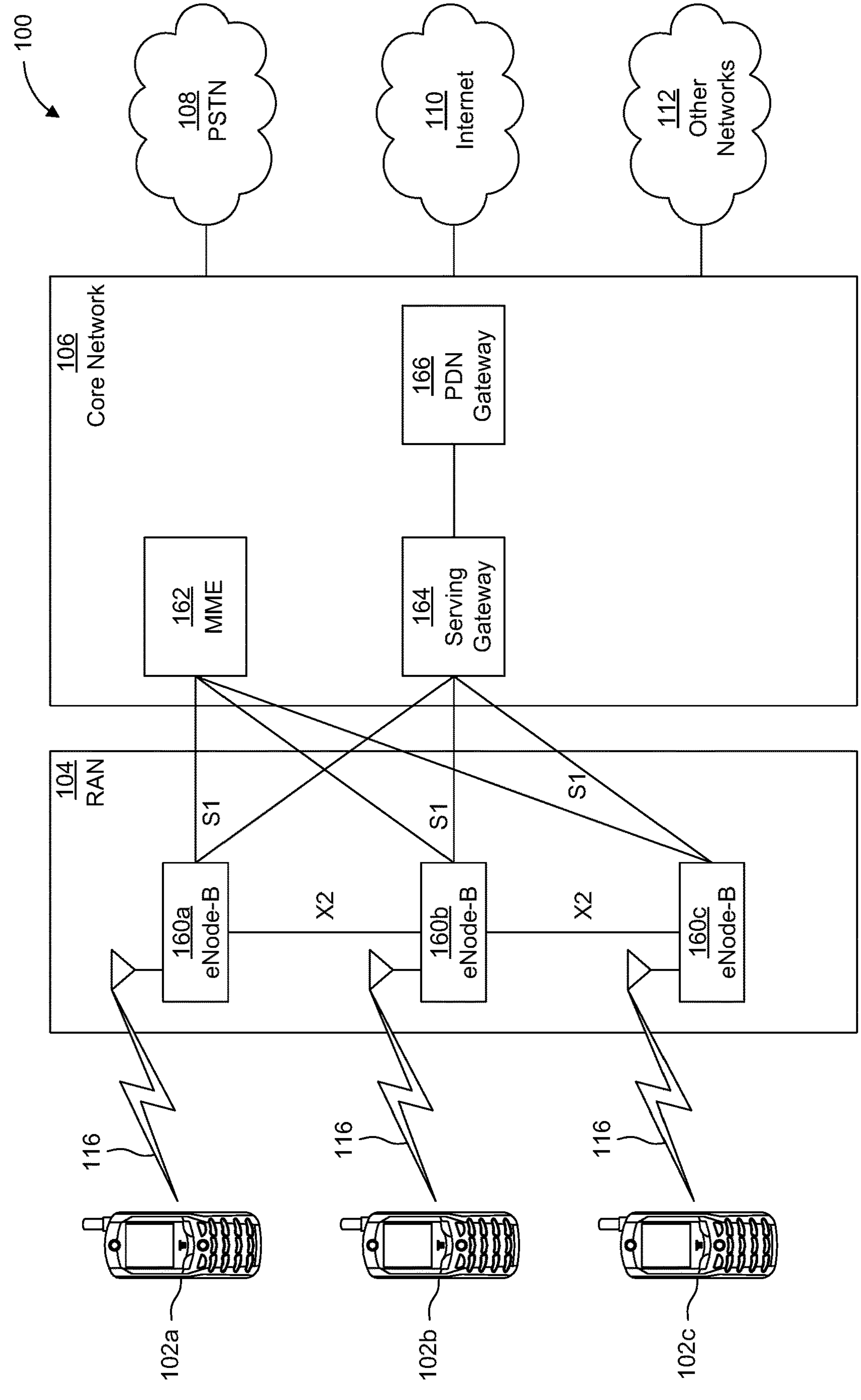
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 10, the eNode-Bs 160*a*, 160*b*, 160*c* may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
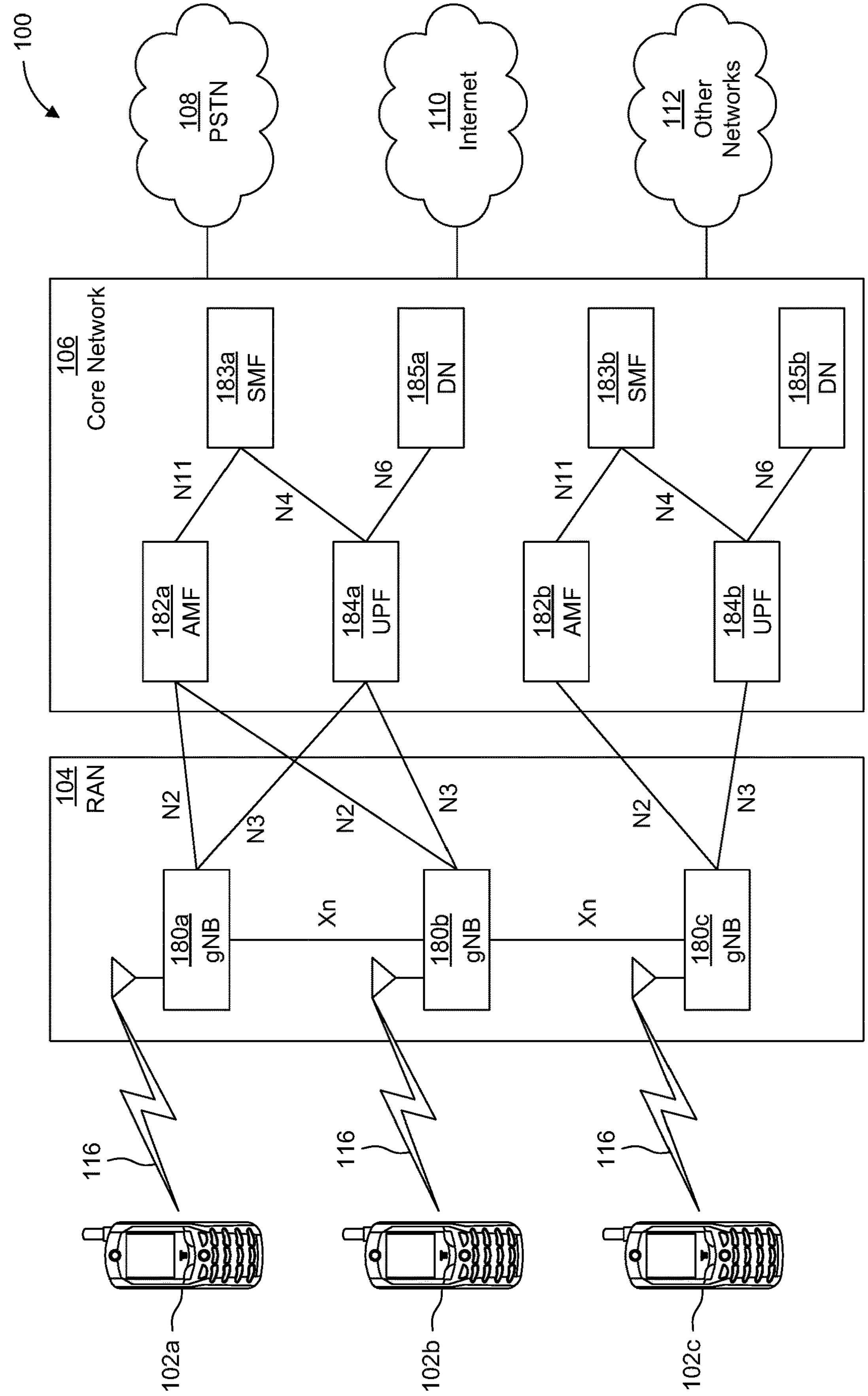
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*,

160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A ProSe WTRU-to-network relay procedure consists of two distinct phases—(1) discovery of the WTRU-to-network relay (relay WTRU) and (2) communication between the remote WTRU and relay WTRU.

To generate a PC5 interface protection key, the remote WTRU may need a ProSe remote user key (PRUK) and an associated PRUK ID from a ProSe Key management Function (PKMF). The PRUK ID may be used to identify the PRUK that is then retrieved from the PKMF of the remote WTRU PKMF. The PRUK may be used to generate session key for any of the relays under a particular PKMF and hence only one PRUK for each remote WTRU is needed from a particular PKMF. This PRUK may need to be fetched by the remote WTRU from its PKMF while it is still in coverage.

The remote WTRU may fetch its PRUK from the PKMF using the key request/response messages or may receive one through GBA PUSH as part of establishing the communication with the relay WTRU. The relay WTRU may fetch the key that will be used to secure the ProSe communication by sending to its PKMF, the PRUK ID or WTRU permanent ID if the remote WTRU does not have a valid PRUK.

If the remote WTRU establishes (e.g., derives) a new PRUK through a GBA Push message, it may overwrite any previously received or established PRUK. Once a PRUK established through a GBA Push message has been used to calculate a key for a successful relay connection establishment, the remote WTRU may delete any previous PRUK for this PKMF.

Figure 2:
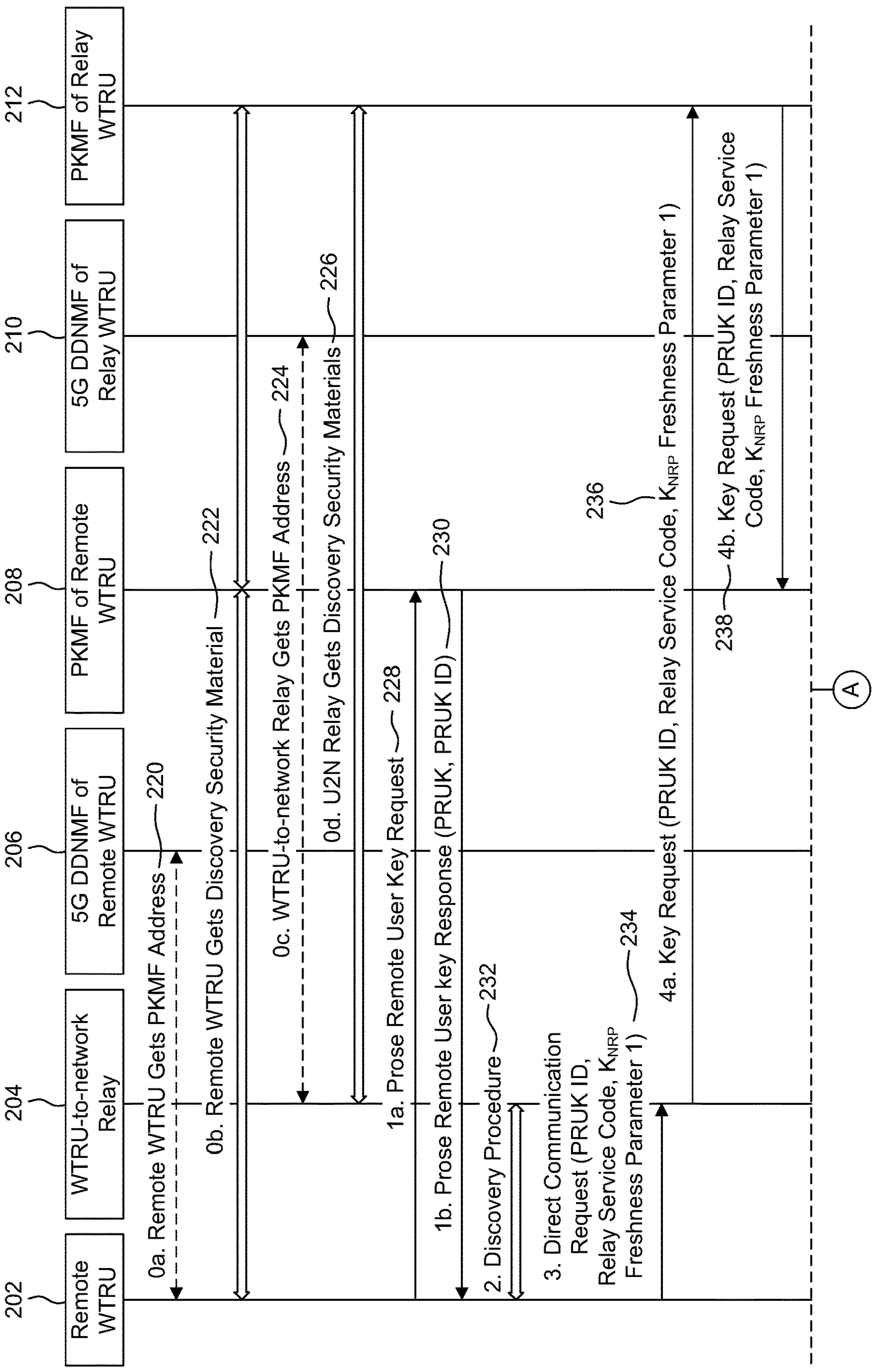
FIG. 2 illustrates an example of a PC5 relay communications setup.
Figure 2:
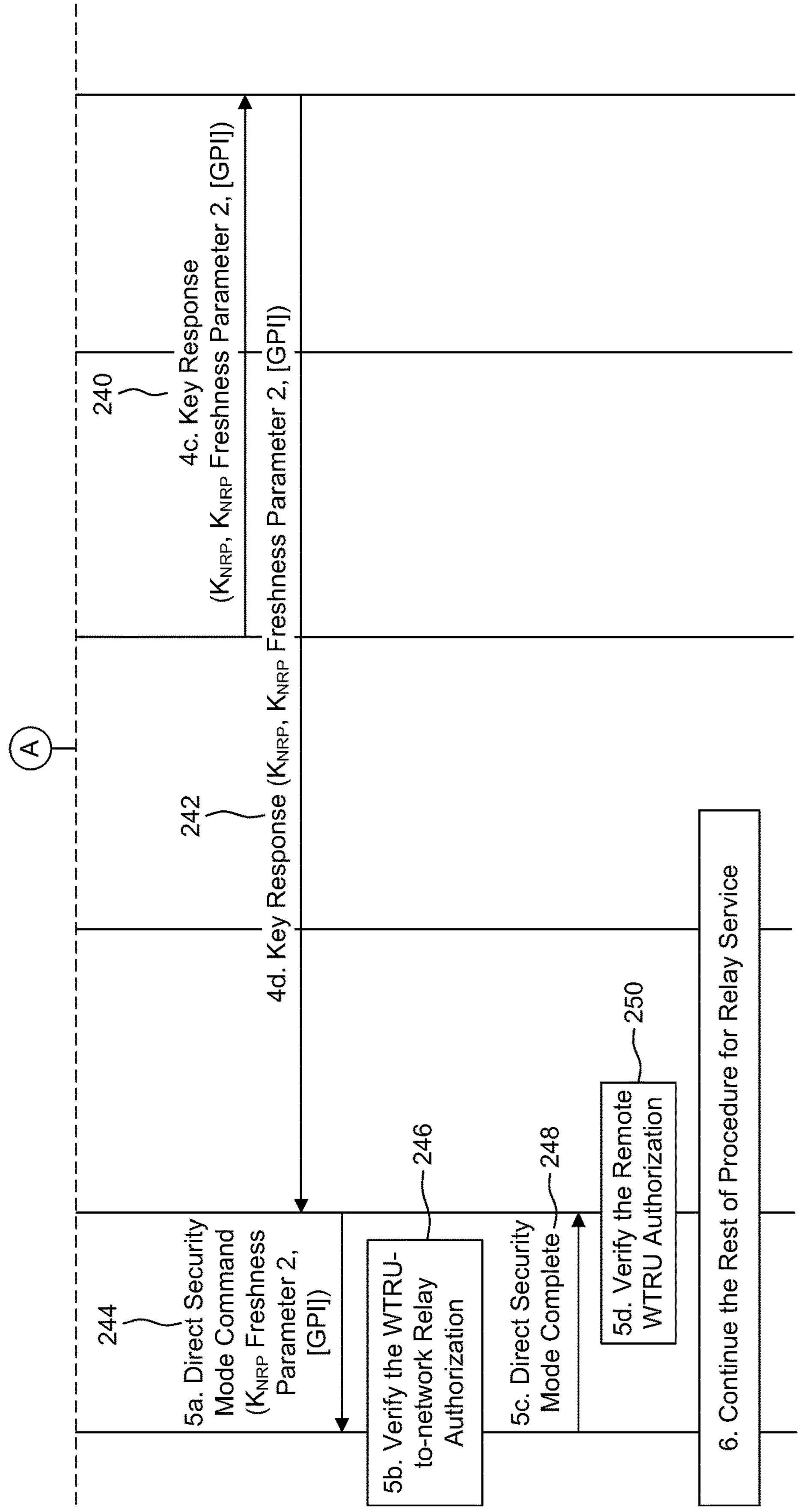

FIG. 2 illustrates an exemplary PC5 relay communications setup. In steps 220 to 226, both the remote WTRU 202 and WTRU-to-network relay (relay WTRU) 204 may acquire a PKMF address from their respective 5G direct discovery name management function (DDNMF). Both the remote WTRU 202 and relay WTRU 204 may then establish a secure connection with their respective PKMF before they receive discovery security materials Specifically, At 220, the remote WTRU 202 may acquire a PKMF address from the 5G DDNMF of the remote WTRU 206. At 222, the PKMF of the remote WTRU 208 may transmit discovery security materials to the remote WTRU 202. The PKMF of the remote WTRU 208 may also transmit discovery security material to the PKMF of the relay WTRU 212. At 224, the WTRU-to-network relay 204 may acquire a PKMF address. At 226, the relay WTRU 204 may acquire discovery security materials.

In steps 228 to 230, while in coverage, the remote WTRU 202 may send a PRUK request message to the PKMF of the remote WTRU 208 and the PKMF of the remote WTRU 208 may then transmit a PRUK and PRUK ID to the remote WTRU 202. Specifically, at 228, the remote WTRU 202 may transmit a PRUK request to the PKMF of the remote WTRU 208. At 230, the PKMF of the remote WTRU 208 may transmit a PRUK response to the remote WTRU 202. The response may include a PRUK ID.

At 232, a discovery procedure may be performed between the remote WTRU 202 and the relay WTRU 204. At 234, the remote WTRU 202 may transmit a direct communication request with the PRUK ID, relay service code (RSC) and $K_{NRP}$ freshness parameter 1 to the relay WTRU 204.

At 236, the relay WTRU 204 may transmit a key request message with the PRUK ID, RSC and $K_{NRP}$ freshness parameter 1 to the PKMF of the relay WTRU 212. At 238, upon receiving the key request message, the PKMF of the relay WTRU 212 may transmit the key request with the PRUK ID, RSC and $K_{NRP}$ freshness parameter 1 to the PKMF of the remote WTRU 208. At 240, if the PRUK needs to be refreshed, the PKMF of the remote WTRU 208 may perform one of the GBA push procedures and may generate $K_{NRP}$ freshness parameter 2 and derive $K_{NRP}$ using the PRUK identified by PRUK ID, RSC, $K_{NRP}$ freshness parameter 1 and $K_{NRP}$ freshness parameter 2. The PKMF of the remote WTRU 208 may then transmit a key response message with $K_{NRP}$ and $K_{NRP}$ freshness parameter 2 to the PKMF of the relay WTRU 212, along with GBA push information (GPI), if generated. At 242, the PKMF of the relay WTRU 212 may transmit the key response message to the relay WTRU 204.

$K_{NRP}$ freshness parameters are generally known as cryptographic nonce. As described above, a new pair of $K_{NRP}$ freshness parameter 1 and $K_{NRP}$ freshness parameter 2 may be used each time a new authentication takes place between a remote WTRU and a relay WTRU to generate a fresh $K_{NRP}$ key to ensure that old communications cannot be reused in a replay or impersonation attacks. The $K_{NRP}$ freshness parameters may be random/pseudo random numbers.

At 244, the relay WTRU 204 may derive the session key ($K_{NRP-SESS}$) from the $K_{NRP}$, the confidentiality key (NRPEK), and the integrity key (NRPIK). The relay WTRU 204 may then transmit a direct security mode command message to the remote WTRU 202 with the $K_{NRP}$ freshness parameter 2. At 246, the remote WTRU 202 may process the GPI in the direct security mode command message, derives the PRUK, and acquires the PRUK ID from the GPI. The remote WTRU 202 may also derive $K_{NRP}$ from its PRUK, RSC, $K_{NRP}$ Freshness Parameter 1 and the received $K_{NRP}$ freshness parameter 2. The remote WTRU 202 may also derive the session key ($K_{NRP-SESS}$) At 248, the remote WTRU 202 may transmit a direct security mode complete message to the relay WTRU 204. At 250, the relay WTRU 204 may validate the direct security mode complete message.

At 252, the remote WTRU 202 and the relay WTRU 204 may continue the rest of the procedure for the relay service over the secure PC5 link such as establishing a new PDU session or modifying an existing PDU session for relaying, if needed.

One problem that may occur in the above described procedure is that a PRUK that is used for secure ProSe relay communication may become desynchronized between a remote WTRU and its PKMF. When PRUK desynchronization occurs, the PRUK ID in the Direct Communication Request (DCR) may be considered invalid or missing in PKMF due to various reasons, such as the lost previous direct security mode complete message or remote WTRU being subjected to DoS attacks. Due to the PRUK desynchronization between the remote WTRU and its PKMF, the remote WTRU PKMF may not able to map the PRUK ID to the remote WTRU ID. Consequently, the PKMF of the remote WTRU may not be able to trigger a GBA Push for an unidentified remote WTRU or provide the relay with ProSe key material needed to setup the security protection for the ProSe communication (e.g., PC5 link) between the remote WTRU and the relay WTRU. As a result of this desynchronized PRUK scenario, the remote WTRU connection establishment with the WTRU-to-network relay may fail.

The above described problem may result from the attacks when the attacker is able to cause a desync of the PRUK key between the remote WTRU and its PKMF when replaying DCR message to trigger the GBA Push. The attacker may intercept and resend a DCR message repeatedly until it receives a GPI in the DSMC from the relay WTRU (target WTRU may be connected to the relay WTRU or not using the relay communication while this attack happens). The GPI may indicate to attacker that a new PRUK key and PRUK key ID is being used in the PKMF and a PRUK desynchronization between the remote UE and PKMF is achieved. When the remote WTRU tries to reconnect, it may uses its PRUK key ID, which corresponds to a previous PRUK for the PKMF. The remote WTRU may get rejected as its PRUK key ID does not match a valid PRUK key ID in PKMF.

The remote WTRU may need to request a new PRUK from its PKMF over user plane to get out of this to resynchronize its PRUK with its PKMF as a possible remedy. If the remote WTRU is out of coverage the remote WTRU cannot connect to the relay WTRU.

Additionally, when the remote WTRU connection fails (e.g., DSMC message not received), the remote WTRU may also end up in a similar desynchronized PRUK situation. For example, if the DSMC message is lost while the PKMF attempts to establish a new PRUK via GBA Push information that is not received or processed successfully, the WTRU and its PRUK will become out of sync between the remote WTRU and its PKMF.

In some situations, when receiving the key request from a relay WTRU, the PKMF of the remote WTRU may need to launch a GBA Push to establish a new PRUK key with the remote WTRU. The relay WTRU may transmit the DSMC to the remote WTRU, forwarding the new PRUK key ID along with other information in the GBA Push Information (GPI) received from the PKMF. Without the remote WTRU permanent ID such as SUCI/IMSI/GPSI in the DCR, if the PRUK key ID is invalid, the PKMF may not be able to map the PRUK key ID to the WTRU ID to launch the GBA Push.

To prevent this from happening, a preventive solution is to enable the confirmation and acknowledgement of the new PRUK establishment between the remote WTRU and its PKMF. This ensures that the PRUK is synced between the remote WTRU and its PKMF. Additional solutions are described below.

In one embodiment, the remote WTRU may transmit an establishment confirmation message of PRUK and PRUK ID directly via user plane interface (e.g., using a secure PC5 link or Uu link if in coverage) to its home PKMF after the relay communication is setup with the relay WTRU. The confirmation message may include the PRUK ID. The PKMF of the remote WTRU may start a timer when it transmits the key response message with $K_{NRP}$ and $K_{NRP}$ freshness parameter 2 to the PKMF of the relay WTRU and then stop the timer when the confirmation message is received by the PKMF.

Alternatively, the PRUK establishment confirmation message may be sent from the relay WTRU to the PKMF of the remote WTRU after the relay WTRU receives a direct security mode complete message from the remote WTRU at 348. The PKMF of the remote WTRU may stop the timer as soon as it receives the PRUK establishment confirmation message.

When receiving a PRUK establishment confirmation message, the PKMF may determines that the PRUK identified by the PRUK ID is being actively used by the remote WTRU. Any PRUK that has not been confirmed may not become the active PRUK in the PKMF. This may prevent the scenario described above with desynchronization of the PRUK between the remote WTRU and the PKMF.

Figure 3:
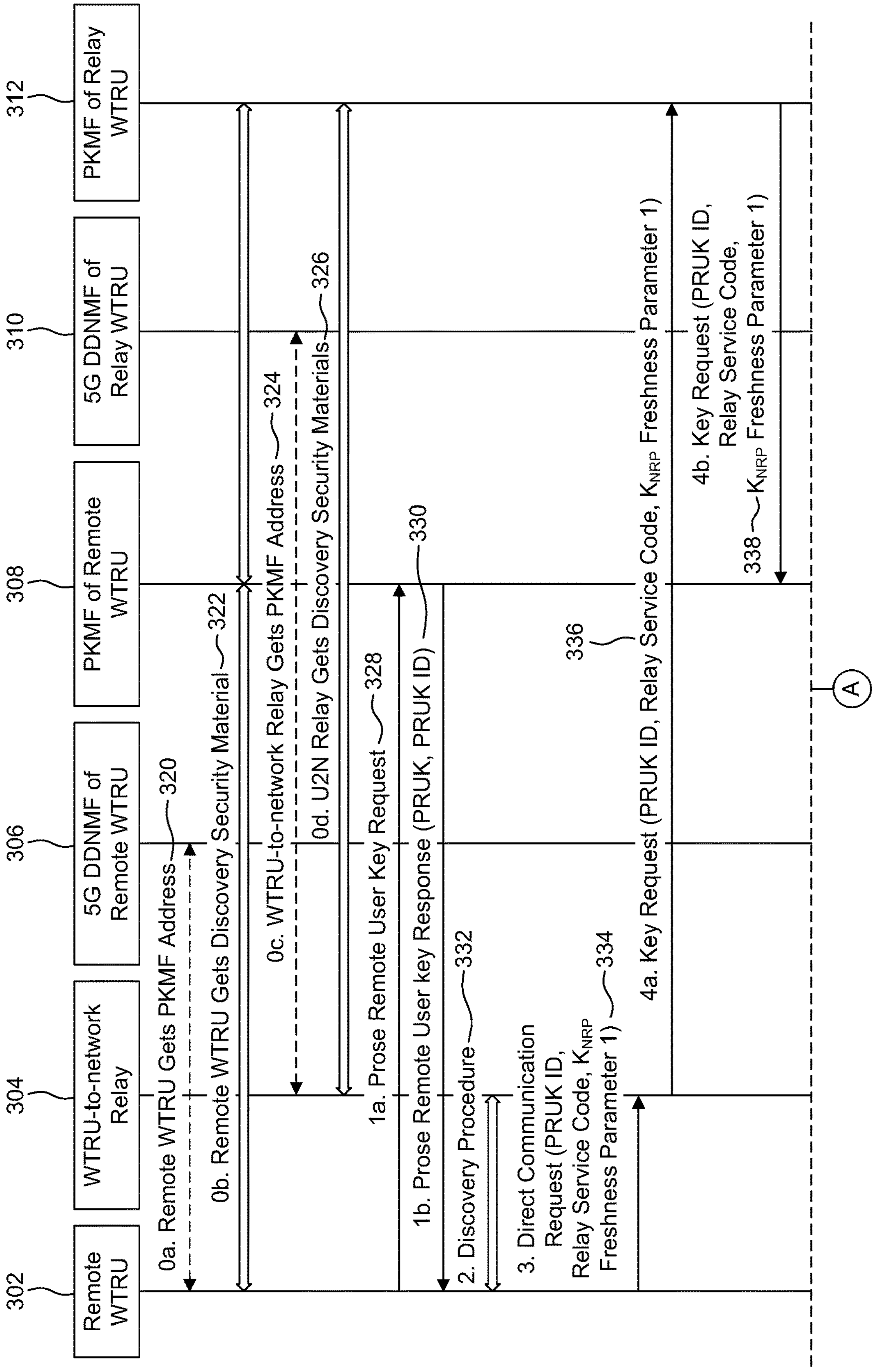
FIG. 3 illustrates an example of an authorization and secure PC5 link establishment procedure for a relay WTRU.
Figure 3:
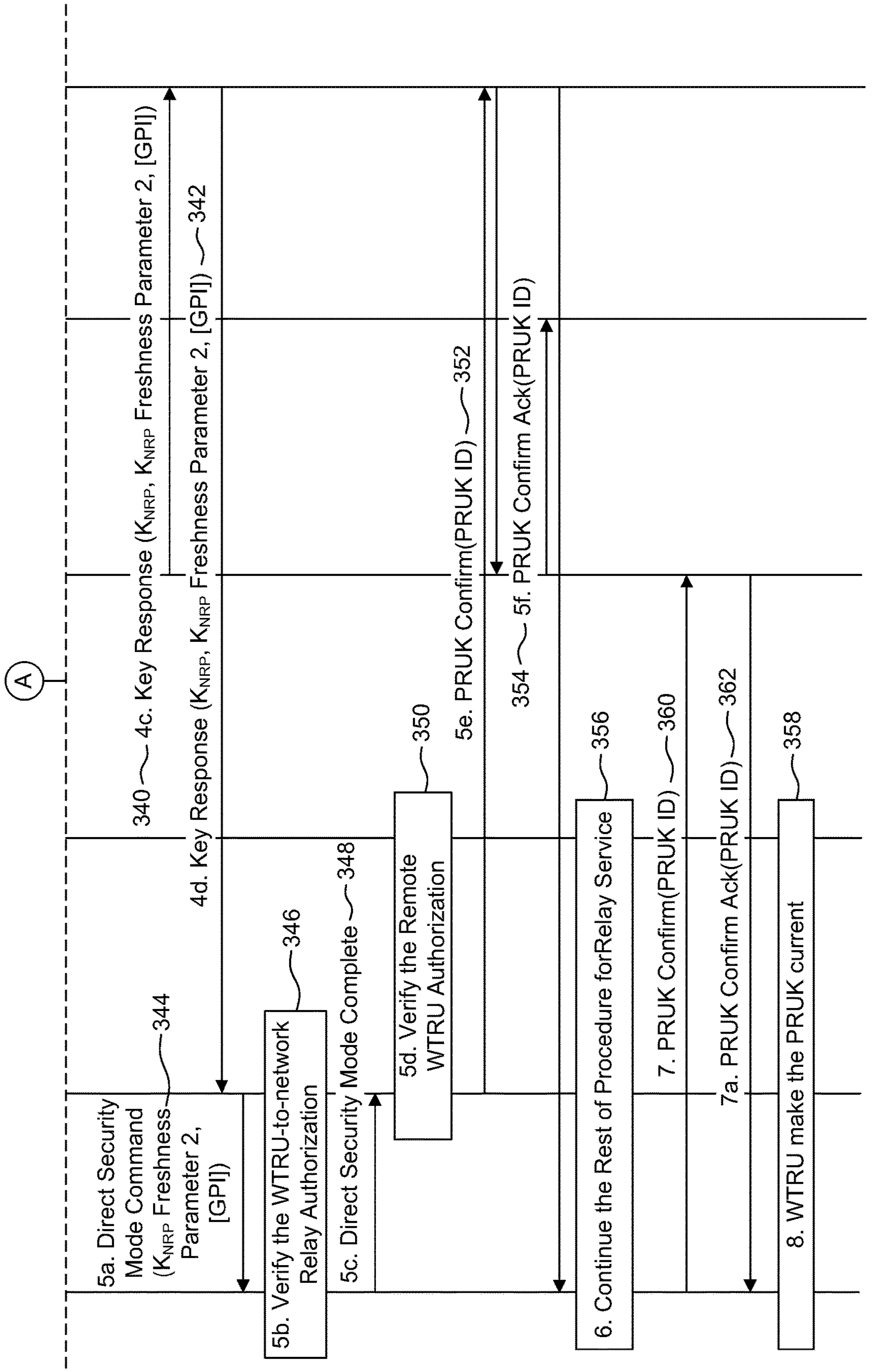

FIG. 3 illustrates an exemplary authorization and secure PC5 link establishment procedure for relay WTRU. In steps 320 to 326, both the remote WTRU 302 and WTRU-to-network relay (relay WTRU) 304 may acquire a PKMF address from their respective 5G direct discovery name management function (DDNMF). Both the remote WTRU 302 and relay WTRU 304 may then establish a secure connection with their respective PKMF before they receive discovery security materials.

Specifically, at 320, the remote WTRU 302 may acquire a PKMF address from the 5G DDNMF of the remote WTRU 306. At 322, the PKMF of the remote WTRU 308 may transmit discovery security materials to the remote WTRU 302. The PKMF of the remote WTRU 308 may also transmit discovery security material to the PKMF of the relay WTRU 312. At 324, the WTRU-to-network relay (i.e., relay WTRU) 304 may acquire a PKMF address. At 326, the relay WTRU 304 may acquire discovery security materials.

In steps 328 to 330, while in coverage, the remote WTRU 302 may send a PRUK request message to the PKMF of the remote WTRU 308 and the PKMF of the remote WTRU 308 may then transmit a PRUK and PRUK ID to the remote WTRU 302. At 328, the remote WTRU 302 may transmit a PRUK request to the PKMF of the remote WTRU 208. At 330, the PKMF of the remote WTRU 308 may transmit a PRUK response to the remote WTRU 202. The response may include a PRUK ID.

At 332, a discovery procedure may be performed between the remote WTRU 302 and the rely WTRU 304. At 334, the remote WTRU 302 sends a direct communication request with the PRUK ID, relay service code (RSC) and $K_{NRP}$ freshness parameter 1 to the relay WTRU 304.

At 336, the relay 304 may transmit a key request message with the PRUK ID, RSC and $K_{NRP}$ freshness parameter 1 to the PKMF of the relay WTRU 312. At 338, upon receiving the key request message, the PKMF of the relay WTRU 312 may transmit the key request with the PRUK ID, RSC and $K_{NRP}$ freshness parameter 1 to the PKMF of the remote WTRU 308. At 340, if the PRUK needs to be refreshed, the PKMF of the remote WTRU 308 may perform one of the GBA push procedures and may generate $K_{NRP}$ freshness parameter 2 and derive $K_{NRP}$ using the PRUK identified by PRUK ID, RSC, $K_{NRP}$ freshness parameter 1 and $K_{NRP}$ freshness parameter 2. The PKMF of the remote WTRU 308 may then transmit a key response message with $K_{NRP}$ and $K_{NRP}$ freshness parameter 2 to the PKMF of the relay WTRU 312, along with GPI, if generated.

The PKMF of the remote UE 308 may start a timer to wait for the PRUK confirmation from the remote WTRU 302, where the PRUK may be used for the communication protection between the remote WTRU 302 and the relay WTRU 304. If the timer expires without receiving the confirmation, the PKMF of the remote WTRU 308 may discard the new PRUK and PRUK ID, and revert back to the old PRUK and PRUK ID. Further, the PKMF of the remote WTRU 308 mark the key as invalid.

At 342, the PKMF of the relay WTRU 312 may transmit the key response message to the relay WTRU 304.

At 344, the relay WTRU 304 may derive the session key ($K_{NRP\text{-}SESS}$) from the $K_{NRP}$, the confidentiality key (NRPEK), and the integrity key (NRPIK). The WTRU-to-network relay 304 may then transmit a direct security mode command message to the remote WTRU 302 with the $K_{NRP}$ freshness parameter 2. At 346, the remote WTRU 302 may process the GPI in the direct security mode command message, derives the PRUK, and acquires the PRUK ID from the GPI. The remote WTRU 302 may also derive $K_{NRP}$ from its PRUK, RSC, $K_{NRP}$ freshness parameter 1 and the received $K_{NRP}$ Freshness Parameter 2. The remote WTRU 302 may also derive the session key ($K_{NRP\text{-}SESS}$). At 348, the remote WTRU 302 may transmit a direct security mode complete message to the relay WTRU 304. At 350, the relay WTRU 304 may validate the direct security mode complete message.

At 352, when the relay WTRU 304 receives the direct security mode complete message, the relay WTRU 304 may transmit a PRUK establishment confirmation message to the PKMF of the relay WTRU 312. The PKMF of the relay WTRU 312 may then forward a PRUK establishment confirmation message to the PKMF of the remote WTRU 308 to confirm the successful establishment of the PRUK key. Upon receiving the confirmation, the PKMF of the remote WTRU 308 may stop the timer, and make the new PRUK/PRUK ID key current and may discard the old PRUK/PRUK ID. At 354, when the PKMF of the remote WTRU 308 receives the confirmation message, it may transmit an acknowledgement message back to the PKMF of the relay WTRU 312. The PKMF of the relay WTRU 312 may then forwards the confirmation message to the relay WTRU 304. The relay WTRU 304 may proceed with a PC5 link setup procedure (e.g., send a direct connection accept (DCA) message to remote WTRU 302) when receiving the acknowledgement message from the PKMF of the relay WTRU 312. When receiving a DCA message, the remote WTRU 302 may discard the old PRUK/PRUK ID and make the new PRUK/PRUK ID current. The remote WTRU 302 and relay WTRU 304 may continue the rest of procedure for the relay service over the secure PC5 link.

In an alternate to 352 and 354, at 360, the remote WTRU 302 may transmit the PRUK acknowledgement message in user plane with the PC5 protection to the PKMF of the remote WTRU 308 to confirm that the PRUK key will be activated for the protection between the remote WTRU 302 and the relay WTRU 304. Upon receiving the confirmation, the PKMF of the remote WTRU 308 may stop the timer started in 340. Upon receiving the confirmation, the PKMF of the remote WTRU 308 may stop the timer and make the new key current. at 362, when the PKMF of the remote WTRU 308 receives the confirmation, it may send an acknowledgement back to the remote WTRU 302.

In an alternative embodiment, the remote WTRU may transmit the PRUK establishment confirmation message in user plane (e.g., via PC5 or Uu link) to confirm the PRUK key establishment at the remote WTRU. Upon receiving the confirmation message from remote WTRU, the PKMF of the remote WTRU may perform the following actions: (1) stop the timer; (2) make the new PRUK/PRUK ID current; (3) discard the old PRUK/PRUK ID; and (4) transmit an PRUK establishment acknowledgement message back to the remote WTRU. When the remote WTRU receives the acknowledgement from the PKMF of the remote WTRU, the remote WTRU may mark the new PRUK and PRUK ID as current, and discard the old PRUK and PRUK ID.

Figure 4:
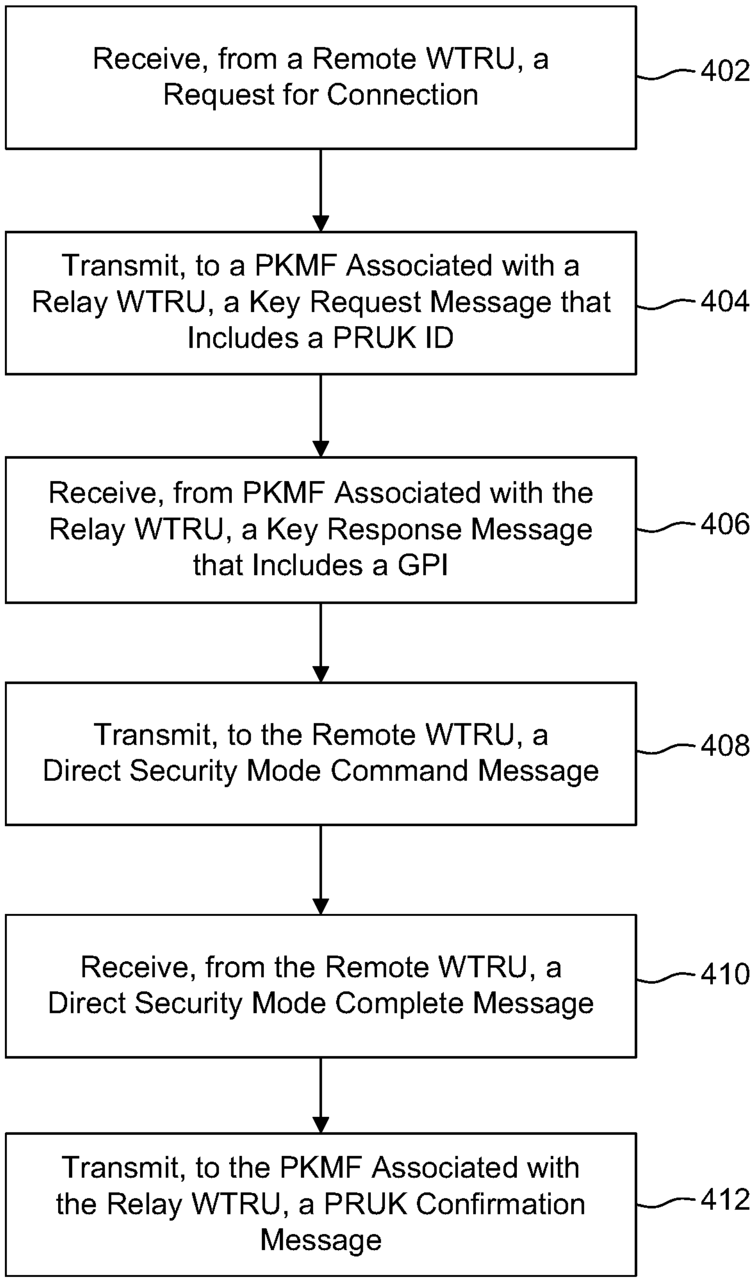
FIG. 4 illustrates is example procedure performed by a relay WTRU to authorize and secure a PC5 link establishment.

FIG. 4 shows steps defined in an example procedure performed by a relay WTRU to authorize and secure a PC5 link establishment. At 402, the relay WTRU may receive, from a remote WTRU, a request for connection. The request for connection may include a PRUK ID. At 404, the relay WTRU may transmit, to a PKMF associated with the relay WTRU, a key request message that includes the PRUK ID that was received from the remote WTRU. At 406, the relay WTRU may receive, from the PKMF associated with the relay WTRU, a key response message that includes a GPI. At 408, on a condition that the relay WTRU successfully receives, from the remote WTRU, the key response message that includes the GPI, the relay WTRU may transmit, to the remote WTRU, a direct security mode command message that includes the GPI. At 410, the relay WTRU may receive, from the remote WTRU, a direct security mode complete message. At 412, on a condition that the direct security mode complete message is successfully received from the remote WTRU, the relay WTRU may transmit, to the PKMF associated with the relay WTRU, a PRUK confirmation message.

In another embodiment, when the PRUK ID is invalid and the PKMF of the remote WTRU cannot launch the GBA Push as described in FIG. 3, the PKMF of the remote WTRU may rejects the key request with a reason code, so that the remote WTRU may send the DCR with a WTRU permanent ID (SUCI or GPSI). The GPSI may be received from the PKMF of the remote WTRU along with PRUK and PRUK ID. If the DCR is sent with a SUCI, the PKMF of the remote WTRU may need to de-conceal the SUCI before starting the GBA Push procedure, or the GBA Push may be initiated with the SUCI. The GBA Push interface to UDM may include a SUCI for the UDM to perform the de-concealment (e.g., using a Subscription Identifier De-concealing Function (SIDF)) before proceeding with the GBA Push processing.

When the remote WTRU transmits the GPSI to trigger a GBA Push, PKMF of the remote WTRU may need to map the GPSI to SUPI/IMSI or invoke GBA Push using GPSI directly. When GPSI is used, the GPSI in the DCR may be protected using the security credentials from the discovery procedure.

In another embodiment, when the remote WTRU receives a direct connection reject message with cause code that indicates an invalid PRUK ID, the rejection from the PKMF of the remote WTRU may cause the remote WTRU to start the PRUK ID request (similar to 228 and 230 in FIG. 2) from the PKMF of the remote WTRU directly if the remote WTRU is in the coverage. Thereafter, the remote WTRU may request a new key/key id from the PKMF of the remote WTRU over user plane (if the remote WTRU is still in PLMN cellular coverage).

In another embodiment, the remote WTRU may include a GPSI or SUCI in the first direct communication request message along with the PRUK ID without waiting for the reject message from the PKMF of the remote WTRU. If a GBA Push procedure is needed, the PKMF of the remote WTRU may directly start the GBA Push using the remote WTRU GPSI or SUCI if the PRUK ID is invalid, without going back to remote WTRU with a rejection code.

Figure 5:
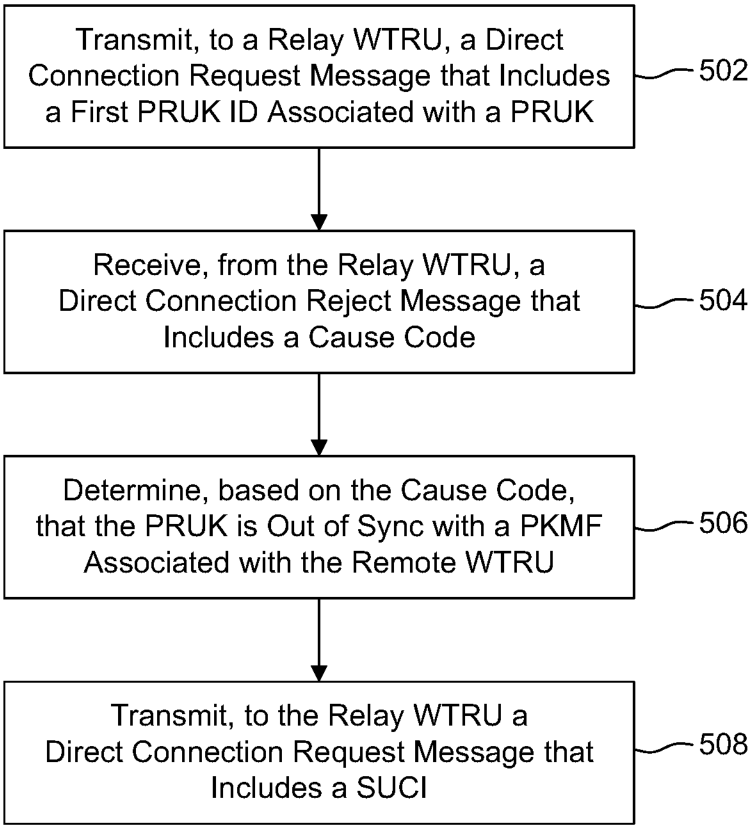
FIG. 5 illustrates is example procedure performed by a remote WTRU during a relay communications setup.

FIG. 5 shows steps defined in an example procedure 500 performed by a remote WTRU during a relay communications setup. At 502, the remote WTRU may transmit, to a relay WTRU, a direct connection request message that includes a first ProSe remote user key (PRUK) ID associated with a PRUK. At 504, the remote WTRU may receive, from the second WTRU, a direct connection reject message that includes a cause code. At 506, the remote WTRU may determine, based on the cause code, that the PRUK is out of sync with a PKMF associated with the remote WTRU. At 508, the remote WTRU may transmit, to the relay WTRU, a direct connection request message that includes a SUCI.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a first wireless transmit/receive unit (WTRU), the method comprising:

receiving, from a second WTRU, a request for connection, wherein the request for connection includes a proximity service (ProSe) remote user key (PRUK) ID;

transmitting, to a ProSe Key Management Function (PKMF) associated with the first WTRU, a key request message that includes the PRUK ID received from the second WTRU;

receiving, from the PKMF associated with the first WTRU, a key response message that includes generic bootstrapping architecture (GBA) push information (GPI);

transmitting, to the second WTRU, a direct security mode command message that includes the GPI;

receiving, from the second WTRU, a direct security mode complete message, wherein the first WTRU authenticates the second WTRU for PC5 link establishment by exchanging the PRUK ID with the PKMF and transmitting a PRUK confirmation message before accepting the request for connection;

transmitting, to the PKMF associated with the first WTRU, a PRUK establishment confirmation message that includes the PRUK ID;

receiving, from the PKMF associated with the first WTRU, an acknowledgement message, in response to the PRUK establishment confirmation message; and transmitting, to the second WTRU, a direct connection accept message.

2. The method of claim 1, further comprising:

validating the direct security mode complete message before transmitting the PRUK establishment confirmation message.

3. The method of claim 1, wherein the acknowledgement message received from the PKMF associated with the first WTRU is returned from the PKMF associated with the second WTRU in response to the PRUK establishment confirmation message.

4. The method of claim 1, wherein the request for connection is a Direct Communication Request message.

5. The method of claim 1, wherein the key request message includes a relay service code (RSC) and $K_{NRP}$ freshness parameter 1.

6. The method of claim 1, wherein the direct security mode command message includes a $K_{NRP}$ freshness parameter 2.

7. A first wireless transmit/receive unit (WTRU), comprising:

a transceiver; and a processor; wherein the transceiver and processor are configured to:

receive, from a second WTRU, a request for connection, wherein the request for connection includes a proximity service (ProSe) remote user key (PRUK) ID;

transmit, to a ProSe Key Management Function (PKMF) associated with the first WTRU, a key request message that includes the PRUK ID received from the second WTRU;

receive, from the PKMF associated with the first WTRU, a key response message that includes generic bootstrapping architecture (GBA) push information (GPI);

transmit, to the second WTRU, a direct security mode command message that includes the GPI;

receive, from the second WTRU, a direct security mode complete message;

authenticate the second WTRU for PC5 link establishment by exchanging the PRUK ID with the PKMF and transmitting a PRUK confirmation message before transmitting a direct connection accept message;

transmit, to the PKMF associated with the first WTRU, a PRUK establishment confirmation message wherein the PKMF associated with the first WTRU forwards the PRUK establishment confirmation message to a PKMF associated with the second WTRU to confirm successful establishment of the PRUK key and that the PRUK identified by the PRUK ID is being actively used for communication protection;

receive, from the PKMF associated with the first WTRU, an acknowledgement message, in response to the PRUK establishment confirmation message; and transmit, to the second WTRU, the direct connection accept message.

8. The first WTRU of claim 7, wherein the transceiver and processor are further configured to:

validate the direct security mode complete message before transmitting the PRUK establishment confirmation message.

9. The first WTRU of claim 7, wherein the acknowledgement message received from the PKMF associated with the first WTRU is returned from the PKMF associated with the second WTRU in response to the PRUK establishment confirmation message.

10. The first WTRU of claim 7, wherein the request for connection is a Direct Communication Request message.

11. The first WTRU of claim 7, wherein the key request message includes a relay service code (RSC) and $K_{NRP}$ freshness parameter 1.

12. The first WTRU of claim 7, wherein the direct security mode command message includes a $K_{NRP}$ freshness parameter 2.

13. A first wireless transmit/receive unit (WTRU), comprising:

a transceiver; and a processor; wherein the transceiver and processor are configured to:

transmit, to a second WTRU, a request for connection that includes a first proximity service (ProSe) remote user key (PRUK) ID associated with a PRUK;

receive, from the second WTRU, a connection reject message that includes a cause code, wherein the cause code indicates that the PRUK ID is invalid;

determine, based on the cause code, that the PRUK is out of sync with a proximity service (ProSe) Key Management Function (PKMF) associated with the first WTRU;

authenticate the second WTRU for relay connection setup by using the cause code to determine that the PRUK is out of sync with the PKMF and by starting, while the first WTRU is in coverage, a PRUK ID request from the PKMF associated with the first WTRU;

request a new key PRUK or key ID from the PKMF associated with the first WTRU over user plane; and transmit, to the second WTRU, a direct connection request message that includes a subscription concealed identifier (SUCI), wherein the PKMF associated with the first WTRU de-conceals the SUCI before starting a generic bootstrapping architecture (GBA) Push procedure using the SUCI.

14. The first WTRU of claim 13, wherein the direct connection request message that includes the SUCI is a Direct Communication Request message.

* * * * *